United States Patent [19]

Gutshall

[11] 4,069,730
[45] Jan. 24, 1978

[54] THREAD-FORMING SCREW

[75] Inventor: Charles E. Gutshall, Rockford, Ill.

[73] Assignee: Wales-Beech Corporation, Rockford, Ill.

[21] Appl. No.: 692,470

[22] Filed: June 3, 1976

[51] Int. Cl.$^2$ ............................................. F16B 25/00
[52] U.S. Cl. ......................................................... 85/47
[58] Field of Search .......................... 85/47, 41, 1 L; 10/10 R, 152 T, 152 R

[56] References Cited
U.S. PATENT DOCUMENTS

| Re. 6,571 | 8/1975 | Young | 85/47 |
| 328,139 | 10/1885 | Patten | 85/1 L |
| 3,083,609 | 4/1963 | Lovisek | 85/47 |
| 3,209,383 | 10/1965 | Carlson | 10/152 T |
| 3,370,501 | 2/1968 | Ansingh | 85/47 |

FOREIGN PATENT DOCUMENTS

| 171,334 | 11/1921 | United Kingdom | 85/47 |

Primary Examiner—Ramon S. Britts
Attorney, Agent, or Firm—Merriam, Marshall & Bicknell

[57] ABSTRACT

An improved thread-forming screw has a circular threaded main body portion and a tapered lobular pilot or thread-forming section comprising a plurality of transverse elongated projections or lobes on a circular conical core, each lobe having a sharp ridge running the full length thereof. The sharp edges on the lobes minimize the torque required to form threads in a workpiece, while the circular main body portion maximizes the holding power of the screw in the workpiece.

7 Claims, 12 Drawing Figures

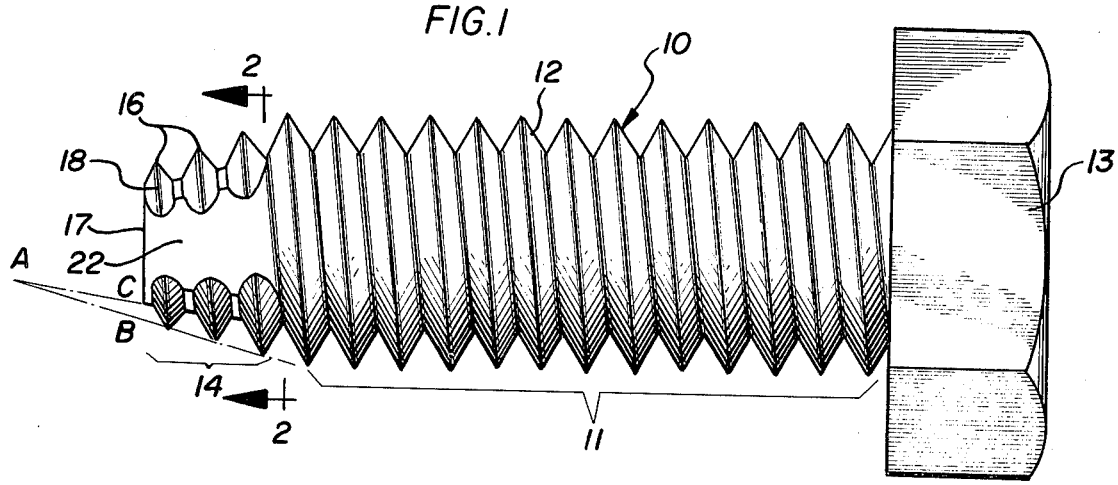
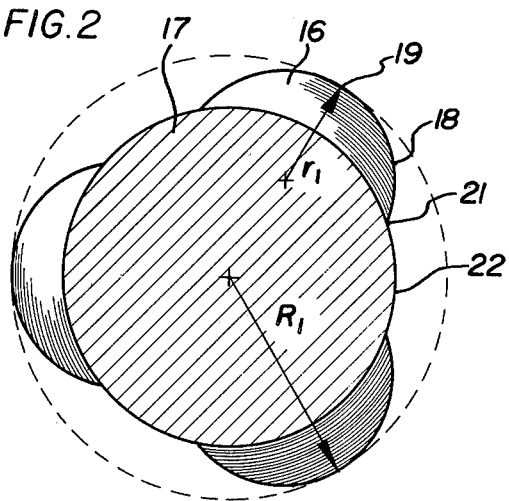
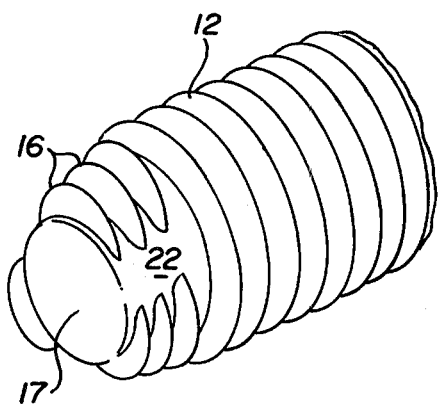
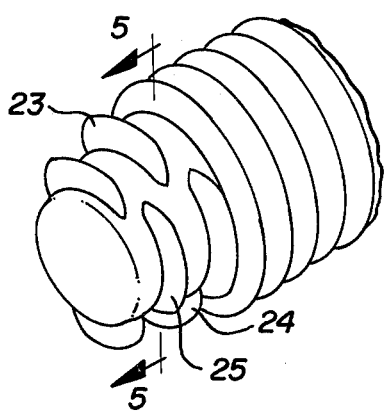
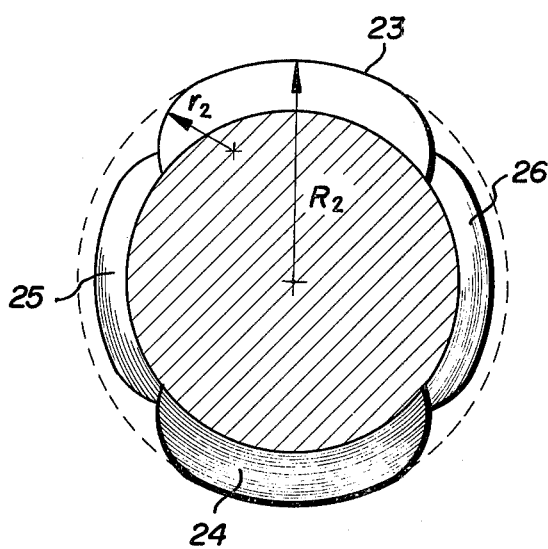

THREAD-FORMING SCREW

BACKGROUND OF THE INVENTION

This invention relates to thread-forming screws and more particularly to a novel thread-forming screw having a circular threaded main body portion for maximum holding power and a novel lobular tapered pilot portion adapted for forming threads in a workpiece with minimum torque, and to apparatus and a method for making the same.

Self-tapping or thread-forming screws in many different variations are known to the art. In general, these screws fall into two types, viz., those in which the thread-forming portion cuts away a portion of the workpiece to produce the thread and those which form the thread by causing the metal or other material in the workpiece to flow without removing any material. Of the two types, thread-forming screws are generally preferred over thread-cutting screws because the former work harden the mating hole for improved strength; they produce no chips or other residue which may create problems; they usually provide better vibration resistance; and, they require fewer operations in their manufacture. The screw of the invention falls in the thread-forming category.

Among the thread-forming screw designs which have been proposed, as shown in U.S. Pat. Nos. 3,083,609; 3,469,491; and 3,472,119, and British Pat. Nos. 582,306; 669,157; and 925,135, are those in which the screw is made from a cylindrical blank having a tapering point, the blank having formed thereon a continuous thread which has a constant minor diameter. Because of the tapering point, the threads in the pilot portion of the screw are not fully formed and have dull unfinished crests. In a variation of such screws, the tapered point of the screw blank is flattened to produce three or more facets on the tapered point before the threads are formed. The flattened facets are intended to reduce circumferential friction by lowering the extent of metal-to-metal contact between the screw and the workpiece. Such screws require relatively high tapping torque since both the crests of the tapping threads and, in the faceted variation, also the leading edges or ramps thereof are dull and therefore inefficient for thread formation.

Another known form of thread-forming screw, as exemplified by U.S. Pat. Nos. 3,195,156; 3,249,152; and 3,426,820, uses a blank which is non-circular, e.g., triangular, throughout its length. After a continuous thread is formed on such a blank, there is produced a screw having threaded lobes which serve to form the threads in the workpiece. Since the thread is sharp and continuous throughout its length and because contact with the workpiece is restricted primarily to the vicinity of the lobes, the tapping torque required with such screws is desirably low. By the same token, however, once the thread is tapped in the workpiece and the screw is fastened in position, its holding power is diminished because of the fact that full engagement of the threads of the screw and the workpiece occurs only in the vicinity of the lobes. Accordingly, the holding power of such a lobular screw is less than that which can be achieved with a circular threaded screw. In addition, the lobular configuration of the blank requires additional steps in its manufacture which tend to increase the cost.

Still another variation of known thread-forming screws, as shown in U.S. Pat. Nos. 3,246,556 and 3,263,473, has a shank which is circular in its main body portion but lobular, e.g., triangular, in the pilot portion, the screw having a thread which is continuous in both the main body and pilot portions. While screws of this type can have a desirable combination of low tapping torque and high holding power, the manufacture of such screws requires additional steps, e.g., the formation of a triangular pilot portion on a circular main shank, or the use of special rolling dies having an undulating surface, both of which increase the cost of manufacture of the screw.

SUMMARY OF THE INVENTION

In accordance with the present invention, there is provided a thread-forming screw which combines the desirable characteristics of low tapping torque and high holding power, and which can be easily and inexpensively made. The main body portion of the screw of the invention is circular in cross-section for maximum holding power in conventional fashion. The pilot or thread-forming portion of the screw, however, has a novel lobular construction comprising a discontinuous thread defined in part by a plurality of transverse elongated projections formed on a circular conical or frusto-conical core. The projections or lobes are characterized by having a sharp ridge running the full length of each lobe, insuring low tapping torque and avoiding the disadvantages of the prior art screws, which have dull, incompletely formed tapping crests or lead-in ramps, or both. In addition, the screw of the invention can be easily and inexpensively made from a cylindrical screw blank using the method and the dies also disclosed herein, thus permitting economies in manufacture compared with thread-forming screws in which the root cross-section is other than circular.

BRIEF DESCRIPTION OF THE DRAWINGS

The invention will be better understood from the following detailed description thereof, taken in conjunction with the accompanying drawings in which:

FIG. 1 is a side view of one embodiment of a thread-forming screw in accordance with the invention;

FIG. 2 is a cross-section along the line 2—2 of FIG. 1, showing the pilot portion of the screw;

FIG. 3 is an isometric view of the pilot portion of the embodiment of FIG. 1;

FIG. 4 is an isometric view of the pilot portion of an alternative embodiment of the invention;

FIG. 5 is a cross-section along the line 5—5 of FIG. 4, showing the pilot portion of the screw;

DESCRIPTION OF PREFERRED EMBODIMENTS

Figure 6:
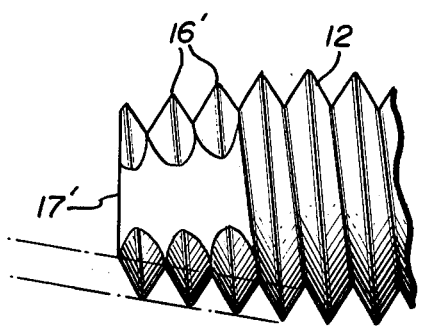
FIG. 6 is a side view of the pilot portion of a screw similar to that of FIG. 1, showing an alternative thread configuration.

As shown in FIGS. 1-3, in one embodiment the thread-forming screw 10 of the invention comprises an elongated shank having a main body portion 11 on which there is formed a continuous helical thread 12. One end of body portion 11 is attached to a conventional head 13 or other means cooperable with a tool for driving the screw. At its other end, body portion 11 is attached to pilot or thread-forming portion 14, which comprises a plurality of threading or tapping lobes 16 protruding from the surface of circular conical or frusto-conical core 17. Each of lobes 16 has a crest 18 which is sharp throughout its entire length, including both its outermost extent or periphery 19 as well as its lead-in ramp 21 (i.e., the point of juncture with the surface of core 17). Lobes 16 are arranged transversely on the core 17 with the outermost points 19 of the lobes falling on an imaginary helix having the same pitch as the thread 12 on body portion 11 and a diameter which increases from a minimum sufficient to permit the screw to enter the pilot hole in a workpiece to a maximum which is substantially that of the thread 12 on body portion 11. It will be seen that because thread-forming crests 18 are sharp, and because blank spaces 22 between adjacent lobes reduce the extent of contact between the screw and the workpiece, the tapping torque which is required by the screw of the invention during a tapping operation is held to a minimum. When, however, the thread is established in the workpiece and engagement of the workpiece with the main body portion of the screw occurs, maximum tensile or holding strength is achieved because of full engagement of the threads 12 of body portion 11 with the threads tapped in the workpiece.

In the embodiment shown in FIGS. 1-3, there are provided three lobes per thread pitch in the thread-forming section 14 of the screw, arranged symmetrically about the longitudinal axis thereof. While this arrangement is effective for its purpose, the invention is not limited to any particular number of lobes per pitch and a smaller, e.g., two, or larger, e.g., four or five, number of lobes per pitch can also be used. Two or three such lobes per pitch are generally preferred, however, because less friction with the workpiece is generated and also because a relatively small number of lobes simplifies the tooling required in the manufacture of the screws.

The three-lobe-per-pitch arrangement shown in FIG. 2 is particularly suitable for screws intended for use with sheet metal. The design of FIG. 2 permits the pilot hole in the workpiece to be made smaller than usual, so that the action of the tapping lobes 16 together with the alternating blank spaces 22 between lobes causes the sheet metal to extrude out of each end of the pilot hole. The extruded metal in effect increases the thickness of the sheet metal in the vicinity of the pilot hole, thus increasing the contact area and thus the strength of the joint between the screw and the workpiece.

As shown in FIG. 1, in the preferred embodiment of the invention the height of the threads in the tapping portion of the screw decreases toward the point of the screw, so that the line of taper of the tapping lobes 16 (represented by line A-B) intersects the projection of the line of taper of core 17 (represented by line A-C). This construction is desirable in order to insure that the crests 18 of all lobes 16 are sharp and fully formed. Alternatively, as shown in FIG. 6, the height of the lobes 16 can be maintained at a constant value, so that a line passing through the tips of the tapping lobes 16' is parallel to the surface of core 17' as shown.

Another preferred arrangement of tapping lobes is illustrated in FIGS. 4 and 5. As shown, each pitch has two diametrically opposed lobes, e.g., 23 and 24, with the lobes in adjacent threads, e.g., 25 and 26, displaced through an angle of about 90°. This arrangement provides a desirable combination of the hole-centering action of a four-lobe point and the low tapping torque arising from the limited contact of the lobes with the workpiece during thread formation.

Figure 7:
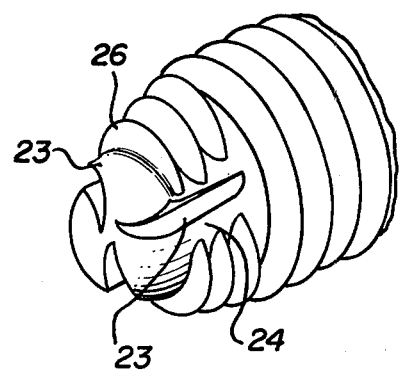
FIG. 7 is an isometric view of the pilot portion of a modified form of the embodiment of FIG. 1, showing auxiliary cutting or hole boring flutes.

FIGS. 2 and 5 illustrate different configurations of the tapping lobes that can be used in the invention. In FIG. 2, the curve representing the sharp crest 18 of lobes 16 is circular and has a radius of curvature $r_1$ which is suitably smaller than the major thread radius, i.e., the distance $R_1$ from the axis of the screw to the outermost periphery 19 of the lobe. Alternatively, as shown in FIG. 7, the lobes 23 can have a double-radius configuration, with a substantial intermediate section of the lobe having a radius of curvature $R_2$ equal to the major thread radius, while terminating at each end in portions having a smaller radius $r_2$. Other configurations, including the use of noncircular outlines in the lobes, can also be used, as will be apparent to those skilled in the art.

Because of the effectiveness of the tapping portion of the screw of the invention in forming threads with a minimum of tapping torque, it will usually be found unnecessary, contrary to conventional practice, to vary the number of threads in the tapping portion, regardless of the thickness of the workpiece. Generally, a three-pitch tapping section will be effective for most workpieces, while a two-pitch tapping section may be desirable for very shallow thread engagements.

Figure 8:
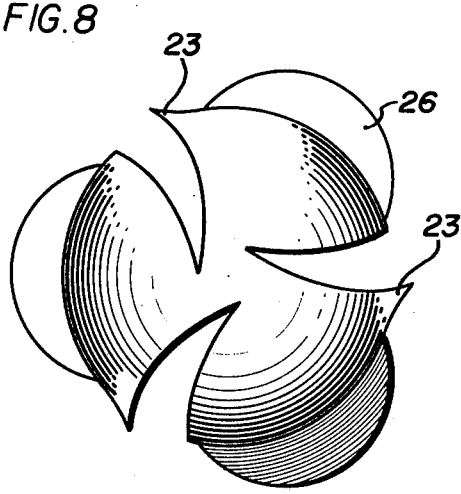
FIG. 8 is an end view of the embodiment of FIG. 7.
Figure 12:
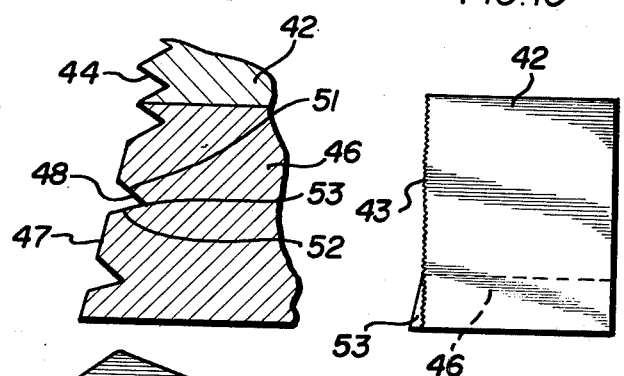
FIG. 12 is an enlarged cross-sectional view along the line 12—12 of FIG. 9.
Figure 10:
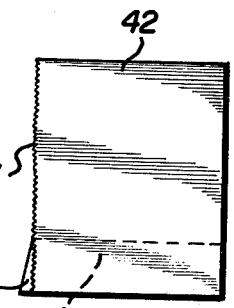
FIG. 10 is a right end view of the die of FIG. 9.
Figure 11:
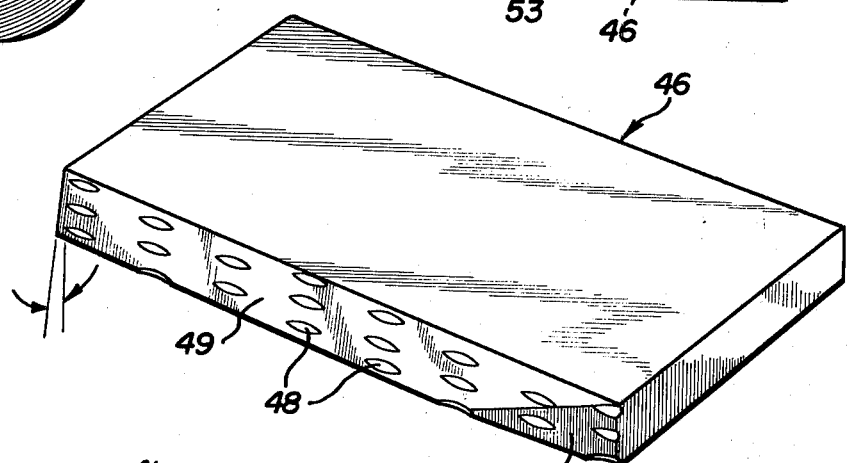
FIG. 11 is an enlarged isometric view of a section of the die of FIG. 9, used for forming the lobular pilot portion of the screw.

The blank spaces, e.g., 22, between lobes in the tapping section of the screw of the invention can be used to advantage to produce screws having desirable characteristics for specialized applications. For example, as shown in FIGS. 7 and 8, the tapping portion of a screw similar to that shown in FIG. 2 can be modified by providing longitudinal cutting flutes 23 in the spaces 24 between tapping lobes 26, which flutes extend to the tip of the screw. After suitable hardening, such a modified screw can be used as a drill for producing or enlarging a pilot hole, in addition to forming threads therein, in such materials as glass-covered sheet metal, stone-covered building panels and the like. In other variations, knurls or grooves can be formed in the blank spaces between the flutes to receive and hold sealing or friction-lock materials as necessary or desirable for certain applications.

Figure 9:
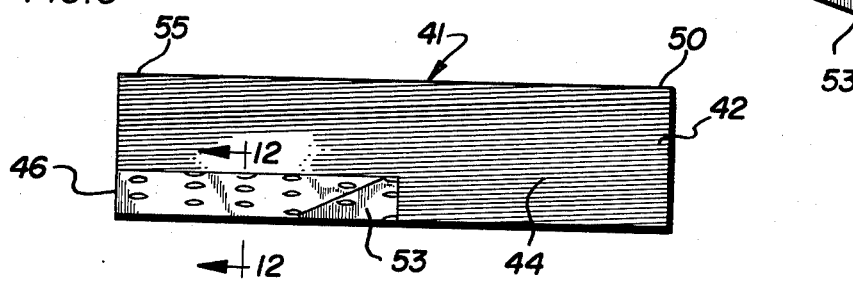
FIG. 9 is a front view of a die suitable for use in pairs for rolling a screw in accordance with the invention.

The screw of the invention can be made by rolling a cylindrical blank between a pair of opposed dies having faces provided with appropriate configurations. A die suitable for this purpose is shown in FIG. 9. The die 41 contains two sections, a first section 42 having a flat face 43 provided with grooves 44 inclined with respect to base 45 for forming threads in the main body portion of the screw in conventional fashion and a second section 46 inletted in the lower left quadrant of first section 42. The face 47 of second section 46 tapers outwardly and downwardly from the face 43 of first section 42 and is provided with a plurality of depressions 48 arranged in vertical rows alternating along the length of the section with flat generally vertical bands 49.

Depressions 48 are spaced vertically and horizontally along face 47 and sized as necessary for production of the desired pilot point configuration. The depressions 48 are also inclined to parallel the pitch of the grooves 44 in die section 42. In order to assure the formation of a sharp crest, e.g., 16 on each lobe, the upper and lower inner surfaces 51 and 52 of each depression 48 meet at a line of juncture 53 which is made as sharp as possible. The inclined face 47 of die section 46 simultaneously produces a tapered work-entering pilot portion provided with tapping lobes, e.g., 16, formed by depressions 48, alternating with blank spaces, e.g., 22, produced by flat bands 49.

During a thread-forming operation using a pair of dies in accordance with the invention, the screw blank rolls along the surface of die 41 from beginning end 50 to finishing end 55 in FIG. 9. In order to avoid a jarring impact between the blank and the projecting inclined face of die section 42 intermediate the ends of the die, a portion of section 42 is tapered to provide a lead-in face 53 which acts as a transition from the flat vertical face of die section 42 to the inclined face 47 of die section 46.

It will be seen that the invention provides a novel thread-forming screw which combines the holding power of cylindrical threaded body portion with the superior tapping ability of a lobular sharp-crested tapping section, in a form which is readily fabricated and hence competitive in cost with known thread-forming screws having inferior tapping characteristics.

The foregoing detailed description has been given for clearness of understanding only, and no unnecessary limitations should be understood therefrom, as modifications will be obvious to those skilled in the art.

I claim:

1. A thread-forming screw comprising:
   an elongated shank including a substantially cylindrical main body portion having a continuous thread formed thereon;
   means at one end of said body portion cooperable with a tool for turning said screw;
   a work-entering tapered thread-forming pilot portion at the other end of said body portion;
   said pilot portion comprising a conical core having a substantially circular cross-section and a plurality of elongated tapping lobes extending outwardly from the surface of said core, each of said lobes having a sharp, fully formed outer ridge along its entire length, the sharp outer ridge on each of said lobes beginning and ending at the juncture of said lobes with said core;
   said lobes being disposed transversely on said core and spaced so that the outermost point on each of said sharp lobes falls on a helix having the same pitch as the thread on said main body portion and a diameter which increases from a minimum at the work-entering end of said screw to a maximum at the juncture of said pilot portion and said main body portion.

2. A screw in accordance with claim 1 wherein said pilot portion has at least two thread pitches.

3. A screw in accordance with claim 2 wherein each of said pitches has two diametrically opposed lobes, the lobes in adjacent pitches being angularly displaced about the longitudinal axis of said screw.

4. A screw in accordance with claim 2 wherein each of said pitches has three lobes symmetrically spaced about the circumference of said core.

5. A screw in accordance with claim 1 wherein the maximum height of each of said lobes above the surface of said core is substantially uniform.

6. A screw in accordance with claim 1 wherein the maximum height of each of said lobes above the surface of said core decreases in a direction toward the work-entering end of said screw.

7. A screw in accordance with claim 1 wherein said tapping portion is provided with cutting flutes disposed on said core between said lobes, said flutes being adapted to form or enlarge a pilot hole in a workpiece.

* * * * *